Patented July 1, 1930

1,768,632

UNITED STATES PATENT OFFICE

GEORG REINHART, JR., OF MUNICH, GERMANY, ASSIGNOR, BY MESNE ASSIGNMENTS, TO GESELLSCHAFT FUR KALTECHEMIE G. M. B. H., OF MUNICH, GERMANY

LIQUID MIXTURE OF LOW-FREEZING POINT

No Drawing. Application filed October 3, 1928, Serial No. 310,187, and in Germany November 17, 1927.

The present invention has reference to improvements in heat-carriers having a low freezing point for heating plants, and its object is the provision of a salt solution, which, used as the heat carrier liquid in heating plants, prevents freezing of the circulating medium during non-use in cold weather.

It is already known in the manufacture of commercial freezing mixtures to combine an aqueous solution of calcium chloride and an aqueous solution of magnesium chloride, but in this and other similar refrigerants there will be found the disadvantage that owing to the hydrolithic splitting-off of the magnesium chloride at high temperatures an excessive amount of muriatic acid is formed.

This disadvantage, according to the present invention, is effectively prevented, by combining an aqueous solution of calcium chloride with an aqueous solution of aluminum chloride. It is true, the aluminum chloride, likewise, splits off hydrolithically, but in this instance the calcium chloride suffices even at the highest obtaining temperatures as secondary lye former for complete neutralization purposes.

It is difficult to give the exact composition of the heat carrier. The reason for this is:

Chemically pure $CaCl_2$, dissolved in water, has a neutral reaction. It has the hydrogen exponent $P_H$ which equals 7, that is to say, there is contained 1 gram hydrogen in ionic form in $10^7$ liters water.

This is determined by means of the color indicators of Sörensen (Opt. rend. de Lab. Carlsberg, vol. 8, page 28, 1909, or Biochemische Zeitschrift, vol. 21, pages 131, 201, of 1909) in calorimetric manner.

But practically it is impossible to make the heat carrier of chemically pure $CaCl_2$. For this purpose technically pure $CaCl_2$ is used. This, dissolved in water, has an alkaline reaction like a lye. It dyes, for instance, phenolphtalein red. It would, thus, leach zinc out of brass fittings.

It is said the hydrogen exponent $P_H$ of the aqueous solution of technically pure $CaCl_2$ is larger than 7; i. e., there is too little $H^x$ and too much $OH'$; too few hyrogen ions and too many hydroxyl ions.

To remedy this, there is added $AlCl_3$ until the solution has a perfect neutral reaction; that is, until $P_H$ equals 7; that is to say, that there is then contained 1 gram hydrogen in ionic form in 10,000,000 liters, which can be determined by color indicators (dibromokresolsulfophtalein, dibromthymolsulfophtalein, azolitmin, phenolsulfophtalein, rosolic acid and the like).

Depending upon the condition of the $CaCl_2$, more or less $AlCl_3$ is required; for instance, for each 1,000 liters water 500 kilograms $CaCl_2$, 2.5 kg. $AlCl_3$; or for each 1,000 liters water 500 kilograms $CaCl_2$, 5 kilogr. $AlCl_3$; or for each 1,000 liters water 500 kilograms $CaCl_2$, 7 kilogr. $AlCl_3$.

In practice, therefore, a proper solution for use may be made by adding to an aqeuous solution of $CaCl_2$, $AlCl_3$ until it shows a perfectly neutral reaction; that is, when its $P_H$ equals 7.

It is well known in this art to use a pure calcium chloride solution for the stated purposes. Such a solution has a basic reaction and has less rust-forming tendencies than neutral solutions, but it will leach the zinc out of brass and soon cause leakage of manometers, cocks, reducing valves and the like fittings. The new strictly neutral solution will not do this; besides, at equal density, it will show a higher specific heat and a lower specific viscosity than other similar solutions. The basic substances going into the mixture are pre-freed from the usual admixtures in any suitable manner, and the mixture is then carefully filtered, and for handling and shipping purposes it may be concentrated by evaporation or reduced to solid state by centrifuging or other suitable means.

What I claim is:—

A liquid heat carrier of low freezing point, consisting of a mixture of an aqueous solution of calcium chloride and an aqueous solution of aluminum chloride combined in such proportions as to have a neutral reaction.

GEORG REINHART, JUNIOR.